United States Patent
Arai et al.

(10) Patent No.: US 6,456,607 B2
(45) Date of Patent: *Sep. 24, 2002

(54) APPARATUS AND METHOD FOR TRANSMITTING AN IMAGE SIGNAL MODULATED WITH A SPREADING CODE

(75) Inventors: Hideyuki Arai, Kawasaki; Hirofumi Suda, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,970

(22) Filed: Oct. 10, 1997

(30) Foreign Application Priority Data

Oct. 16, 1996 (JP) .............................. 8-273525
May 22, 1997 (JP) .............................. 9-132243

(51) Int. Cl.$^7$ ............................... H04B 7/216
(52) U.S. Cl. ...................... 370/335; 370/342
(58) Field of Search ............... 370/319, 320, 370/328, 329, 335, 342, 441, 479; 375/130, 132, 133, 134, 135, 136, 137, 146, 147

(56) References Cited

U.S. PATENT DOCUMENTS

| | | | | | |
|---|---|---|---|---|---|
| 5,067,017 A | * | 11/1991 | Zucker | ........................ | 348/389 |
| 5,127,021 A | * | 6/1992 | Schreiber | ..................... | 375/200 |
| 5,140,610 A | * | 8/1992 | Holliday et al. | ............ | 375/201 |
| 5,311,543 A | | 5/1994 | Schreiber | ....................... | 375/1 |
| 5,365,264 A | * | 11/1994 | Inoue et al. | ................... | 348/70 |
| 5,442,625 A | | 8/1995 | Gitlin et al | ................... | 370/18 |
| 5,463,656 A | * | 10/1995 | Polivka et al. | ............... | 375/200 |
| 5,663,981 A | * | 9/1997 | Takahashi | ..................... | 375/208 |
| 5,729,535 A | * | 3/1998 | Rostoker et al. | ............. | 370/328 |
| 5,729,825 A | * | 3/1998 | Kostreski et al. | ............. | 455/3.1 |
| 5,734,648 A | * | 3/1998 | Adachi et al. | ............... | 370/342 |
| 5,838,718 A | * | 11/1998 | Ichihashi | ..................... | 375/202 |
| 5,975,531 A | * | 11/1999 | Rebec et al. | ................. | 275/240 |

FOREIGN PATENT DOCUMENTS

| | | |
|---|---|---|
| EP | 0680157 | 11/1995 |
| JP | 07143027 | 6/1995 |
| JP | 08163085 | 6/1996 |

OTHER PUBLICATIONS

Gaudenzi et al., "High Efficiency Voice Activated CDMA Mobile Communication System Based on Master Code Synchronization," Communications Technology For The 1990's And Beyond, Dallas, Nov. 27–30, 1989, IEEE, vol. 2, pp 733–737.

Berruto et al., "Variable–Rate for the Basic Speech Service in UMTS," Personal Communication—Freedom Through Wireless Technology, Secaucus, NJ, May 18–20, 1993, IEEE, No. Conf 43, pp 520–523.

* cited by examiner

*Primary Examiner*—Kwang Bin Yao
(74) *Attorney, Agent, or Firm*—Fitzpatrick, Cella, Harper & Scinto

(57) ABSTRACT

An information signal processing apparatus discriminates a significance factor of an input information signal. A modulation process of the information signal is determined in accordance with the discriminated significance factor. The modulated information signal is transmitted to an external apparatus. Since the modulation process of an information signal to be transmitted is controlled basing upon the significance factor of the information signal, both the transmission error rate and transmission rate can be optimized.

34 Claims, 14 Drawing Sheets

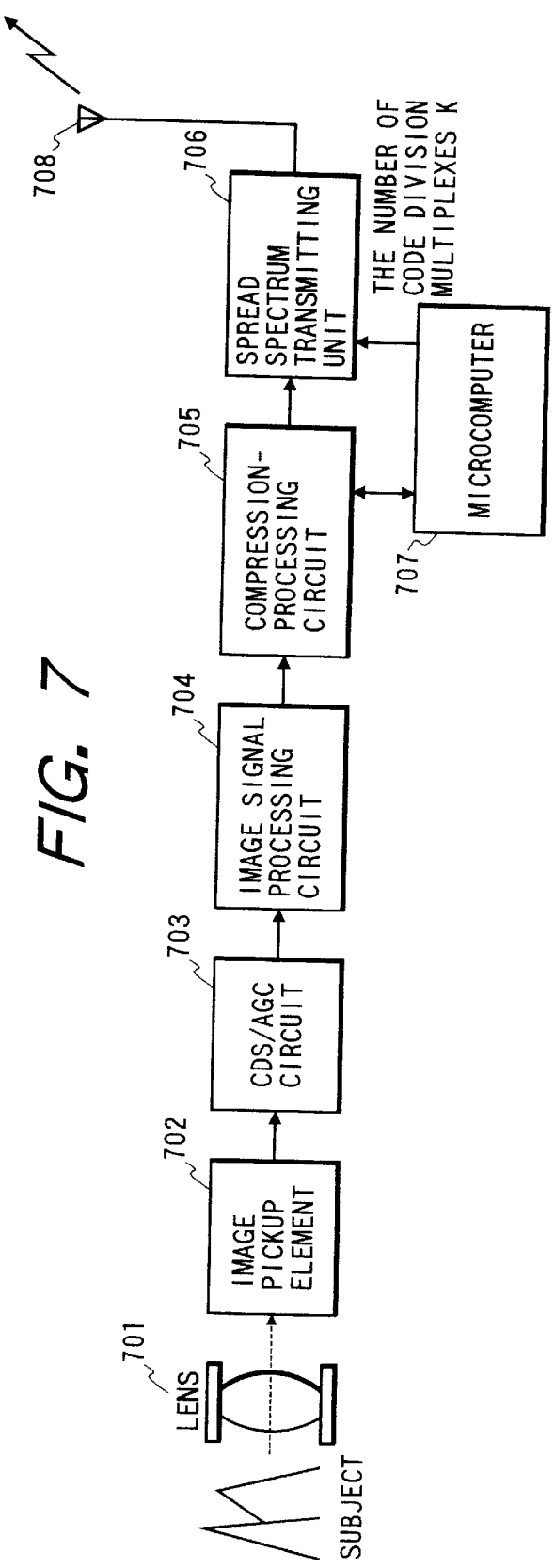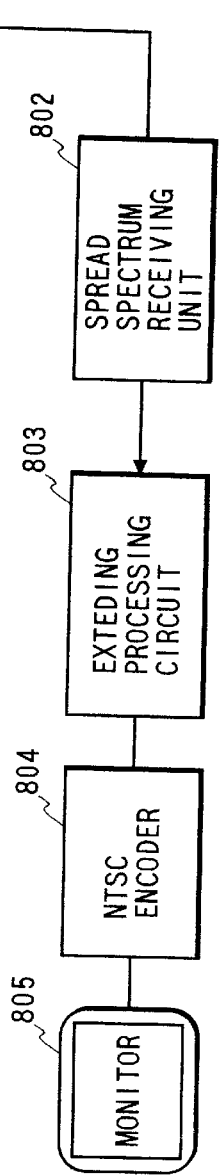

LOW FREQUENCY ← HORIZONTAL COMPONENT → HIGH FREQUENCY

VERTICAL COMPONENT: LOW FREQUENCY ↑ ... ↓ HIGH FREQUENCY

| 11 | 12 | 13 | 14 | 15 | 16 | 17 | 18 |
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |
| 71 | 72 | 73 | 74 | 75 | 76 | 77 | 78 |
| 81 | 82 | 83 | 84 | 85 | 86 | 87 | 88 |

1001, 1002

COMPRESSED IMAGE DATA FOR ONE FRAME

1201 HEADER | 1202 DC COMPONENT (11) | 1203 MARKER | 1204 LOW FREQUENCY COMPONENT (12, 21, 13, 33, 31) | 1205 MARKER | 1206 OTHER COMPONENT | 1207 END MARKER

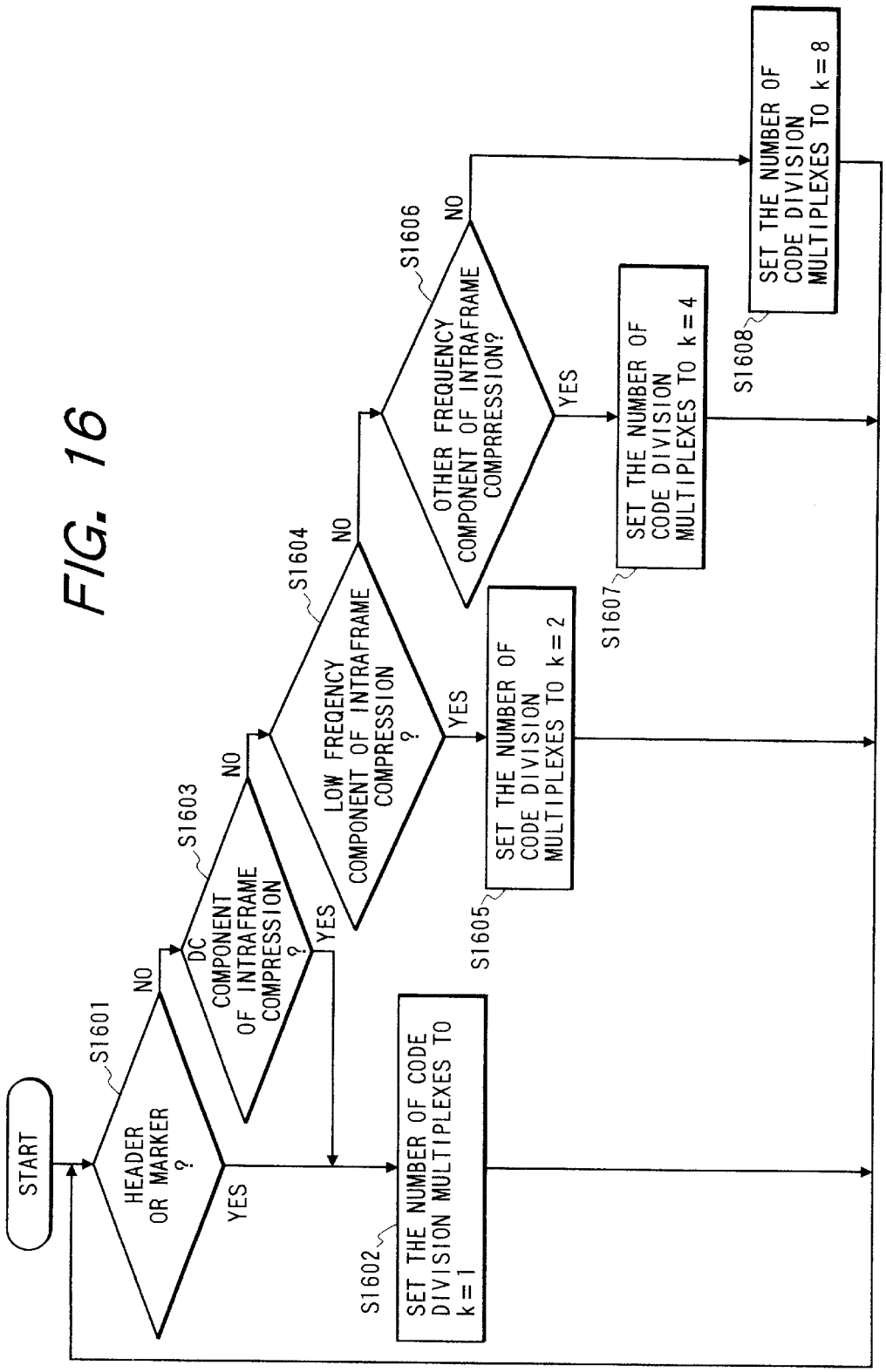

APPARATUS AND METHOD FOR TRANSMITTING AN IMAGE SIGNAL MODULATED WITH A SPREADING CODE

BACKGROUND OF THE INVENTION

1. Field of the Invention

The present invention relates to an information signal communication apparatus, method, and system, and more particularly to a process of modulating an information signal to be transmitted over a transmission path.

2. Related Background Art

In spread spectrum communications using direct spreading, an information signal (baseband signal) to be transmitted is spread modulated by using spread code series such as pseudo noise (PN) codes to generate a spread modulated signal having a bandwidth considerably broader than the baseband signal. This spread modulated signal is converted into a radio frequency (RF) signal by using phase shift keying (PSK), frequency shift keying (FSK) or the like and transmitted to a reception side.

On the reception side, the received RF signal is demodulated to the spread modulated signal before the transmission, and thereafter this spread modulated signal is converted into the original baseband signal before the transmission, by correlating (i.e., reverse spread modulating) the spread modulated signal with the spread code series used for the transmission.

Such spread spectrum modulation makes the bandwidth of a transmission signal considerably broader than that of an information signal. Therefore, under the conditions that the bandwidth of a transmission path is constant, for example, the amount of information to be transmitted becomes vary small as compared to conventional radio communications and only a low transmission rate can be realized.

As a method for solving this problem, there is a method called code division multiplex. With this method, an information signal to be transmitted is first divided into a plurality of parallel data sets, and respective data sets are spread modulated by using a plurality of different spread code series. These spread modulated data sets are multiplexed and converted into an RF signal to be transmitted. This method realizes high speed data transmission even under the conditions that the bandwidth of a transmission path is constant.

This code division multiplex is, however, associated with the following problems. For example, the more the number of data sets to be multiplexed (hereinafter called a multiplex number) is increased to transmit a larger amount of information, the more a phenomenon called multi-path fading becomes likely to occur. This phenomenon lowers the power level of a received signal through interference between a direct wave and a reflected wave having a phase different from the direct wave. Because of this phenomenon, as the multiplex number is increased, errors in transmission signals increase which result in communication interference or failure.

Furthermore, under the transmission path conditions that the amount of noises mixed with a transmission signal changes occasionally, it is necessary to set the multiplex number so as to match such conditions. However, since it is difficult to detect mixed noises during communications, the control of the information amount matching the transmission path conditions is very difficult. Still further, it is also very difficult to control to adaptably change the relationship between a transmission signal error rate and a transmission rate in accordance with the significance factor of a transmission signal.

SUMMARY OF THE INVENTION

An object of the present invention is to solve the above-described problem.

Another object of the present invention is to provide an information signal communication apparatus capable of controlling the modulation process of an information signal in accordance with the significance factor of an information signal to thereby optimize a transmission error rate and a transmission rate.

According to a preferred embodiment achieving the above objects, the invention discloses an information signal communication apparatus, comprising: (a) input means for inputting an information signal; (b) modulating means for modulating the information signal input from the input means; (c) discriminating means for discriminating a significance factor of the information signal input from the input means; (d) control means for controlling a modulation process of the modulating means in accordance with a discrimination result of the discriminating means; and (e) transmitting means for transmitting the information signal modulated by the modulating means.

According to another preferred embodiment, the invention discloses an information signal communication apparatus, comprising: (a) receiving unit for receiving an information signal modulated in accordance with a preset significance factor; (b) discriminating means for discriminating a modulation process given to the information signal; and (c) demodulating means for demodulating the information signal in accordance with a discrimination result of the discriminating means.

According to another preferred embodiment, the invention discloses an information signal communication apparatus, comprising: (a) input means for inputting at least an image signal, a control signal, and an information signal other than the image signal and the control signal; (b) modulating means for modulating a signal input from the input means; and (c) switching means for switching between modulation processes of the modulating means, in accordance with each of the image signal, the control signal and the information signal input from the input means.

According to another preferred embodiment, the invention discloses an information signal communication apparatus, comprising: (a) image pickup means for generating an image signal from a picked-up optical image of a subject; (b) modulating means for modulating the image signal generated by the image pickup means; (c) transmitting means for transmitting the image signal modulated by the modulating means; and (d) control means for controlling the image pickup means in accordance with an external control signal subjected to a modulation process, wherein the modulating means modulates the external control signal by a modulation process different from a modulation process of the control signal.

According to another preferred embodiment, the invention discloses an information signal communication apparatus, comprising: (a) receiving means for receiving an image signal output from an external unit having an image pickup unit, the image signal having been subjected to a predetermined modulation process; (b) discriminating means for discriminating a modulation process of the image signal received with the receiving means; (c) modulating means for modulating a control signal in accordance with a discrimination result of the discriminating means, the control signal controlling the image pickup unit; and (d) transmitting means for transmitting the control signal modulated by the modulating means, wherein the modulating means modulates the control signal by a modulation process different from a modulation process of the image signal.

According to another preferred embodiment, the invention discloses an information signal communication apparatus, comprising: (a) input means for inputting an image signal; (b) converting means for converting the image signal input from the input means into frequency components to divide the image signal into a plurality of frequency domains; (c) modulating means for modulating the image signal converted by the converting means for each frequency domain, the modulating means using a different modulation process for each frequency domain of the image signal; and (d) transmitting means for transmitting the image signal modulated by the modulating means.

According to another preferred embodiment, the invention discloses an information signal communication apparatus, comprising: (a) input means for inputting an information signal; (b) transmitting means for transmitting the information signal input from the input means; (c) discriminating means for discriminating a significance factor of the information signal input from the input means; and (d) control means for controlling a transmission rate of the information signal in accordance with the significance factor of the information signal discriminated by the discriminating means.

According to another preferred embodiment, the invention discloses an information signal communication apparatus, comprising: (a) input means for inputting an image signal; (b) compression means for compression coding the image signal selectively using first and second compression processes, the first compression process compression coding the image signal in a predetermined unit and the second compression process being different from the first compression process; (c) modulating means for modulating the image signal compression coded by the compression means, by using a modulation process corresponding to the first or second compression process; and (d) transmitting means for transmitting the image signal modulated by the modulating means.

Still another object of the present invention is to provide an information signal communication system capable of controlling the modulation process of an information signal in accordance with the significance factor of an information signal to thereby optimize a transmission error rate and a transmission rate.

According to a preferred embodiment achieving the above object, the invention discloses an information signal communication system, comprising: (a) image pickup means for generating an image signal from a picked-up optical image of a subject; (b) modulating means for modulating the image signal generated by the image pickup means; (c) transmitting means for transmitting the image signal modulated by the modulating means; and (d) control means for controlling the image pickup means in accordance with a control signal subjected to a modulation process, wherein the modulating means modulates the control signal by a modulation process different from a modulation process of the control signal.

A still further object of the present invention is to provide an information signal communication method capable of controlling the modulation process of an information signal in accordance with the significance factor of an information signal to thereby optimize a transmission error rate and a transmission rate.

According to a preferred embodiment achieving the above object, the invention discloses an information signal communication method, comprising: (a) an input step of inputting an information signal; (b) a modulation step of modulating the information signal input at the input step; (c) a discrimination step of discriminating a significance factor of the information signal input at the input step; (d) a control step of controlling a modulation process at the modulation step in accordance with a discrimination result by the discrimination step; and (e) a transmission step of transmitting the information signal modulated at the modulation step.

According to another preferred embodiment, the invention discloses an information signal communication method, comprising: (a) a reception step of receiving an information signal modulated in accordance with a preset significance factor; (b) a discrimination step of discriminating a modulation process given to the information signal; and (c) a demodulation step of demodulating the information signal in accordance with a discrimination result at the discrimination step.

According to another preferred embodiment, the invention discloses an information signal communication method, comprising: (a) an input step of inputting at least an image signal, a control signal, and an information signal other than the image signal and the control signal; (b) a modulation step of modulating a signal input at the input step; (c) a switching step of switching between modulation processes at the modulation step in accordance with each of the image signal, the control signal and the information signal input at the input step; and (d) a transmission step of transmitting a signal modulated at the modulation step.

According to another preferred embodiment, the invention discloses an information signal communication method, comprising: (a) an image pickup step of generating an image signal from an optical image of a picked-up subject; (b) a modulation step of modulating the image signal generated at the image pickup step; (c) a transmission step of transmitting the image signal modulated at the modulation step; and (d) a control step of controlling the image pickup step in accordance with an external control signal subjected to a modulation process, wherein the modulation step modulates the external control signal by a modulation process different from a modulation process of the control signal.

According to another preferred embodiment, the invention discloses an information signal communication method, comprising: (a) a reception step of receiving an image signal output from an external unit having an image pickup unit; (b) a discrimination step of discriminating a modulation process of the image signal received at the reception step; (c) a modulation step of modulating a control signal in accordance with a discrimination result by the discrimination step, the control signal controlling the image pickup unit; and (d) a transmission step of transmitting the control signal modulated by the modulation step, wherein the modulation step modulates the control signal by a modulation process different from a modulation process of the image signal.

According to another preferred embodiment, the invention discloses an information signal communication method, comprising: (a) an input step of inputting an image signal; (b) a conversion step of converting the image signal input at the input step into frequency components to divide the image signal into a plurality of frequency domains; (c) a modulation step of modulating the image signal converted at the conversion step at each frequency domain, the modulation step changing a modulation process of the image signal at each frequency domain; and (d) a transmission step of transmitting the image signal modulated at the modulation step.

According to another preferred embodiment, the invention discloses an information signal communication method, comprising: (a) an input step of inputting an information signal; (b) a transmission step of transmitting a significance factor of the information signal input at the input step; (c) a discrimination step of discriminating a significance factor of the information signal input at the input step; and (d) a control step of controlling a transmission rate of the information signal in accordance with the significance factor of the information signal discriminated at the discrimination step.

According to another preferred embodiment, the invention discloses an information signal communication method, comprising: (a) an input step of inputting an image signal; (b) a compression step of compression coding the image signal by selectively using first and second compression processes, the first compression process performing compression coding of the image signal in a predetermined unit and the second compression process being different from the first compression process; (c) a modulation process of performing a modulation process of the image signal compression coded at the compression step, the modulation process corresponding to the first or second compression process; and (d) a transmission step of transmitting the image signal modulated at the modulation step.

Still other objects of the present invention and the advantages thereof will become fully apparent from the following detailed description of the embodiments.

BRIEF DESCRIPTION OF THE DRAWINGS

FIG. 7 is a block diagram showing the structure of a radio transmission apparatus according to a third embodiment of the invention.

FIG. 8 is a block diagram showing the structure of a radio reception apparatus according to the third embodiment of the invention.

FIG. 16 is a flow chart illustrating the operation of a microcomputer 707 of the fourth embodiment.

DETAILED DESCRIPTION OF THE PREFERRED EMBODIMENTS

The preferred embodiments of the present invention will be described in detail hereinafter with reference to the accompanying drawings.

Taking radio communication apparatuses using spread spectrum communication as examples, the preferred embodiments of the invention will be detailed.
(First Embodiment)

Figure 1:
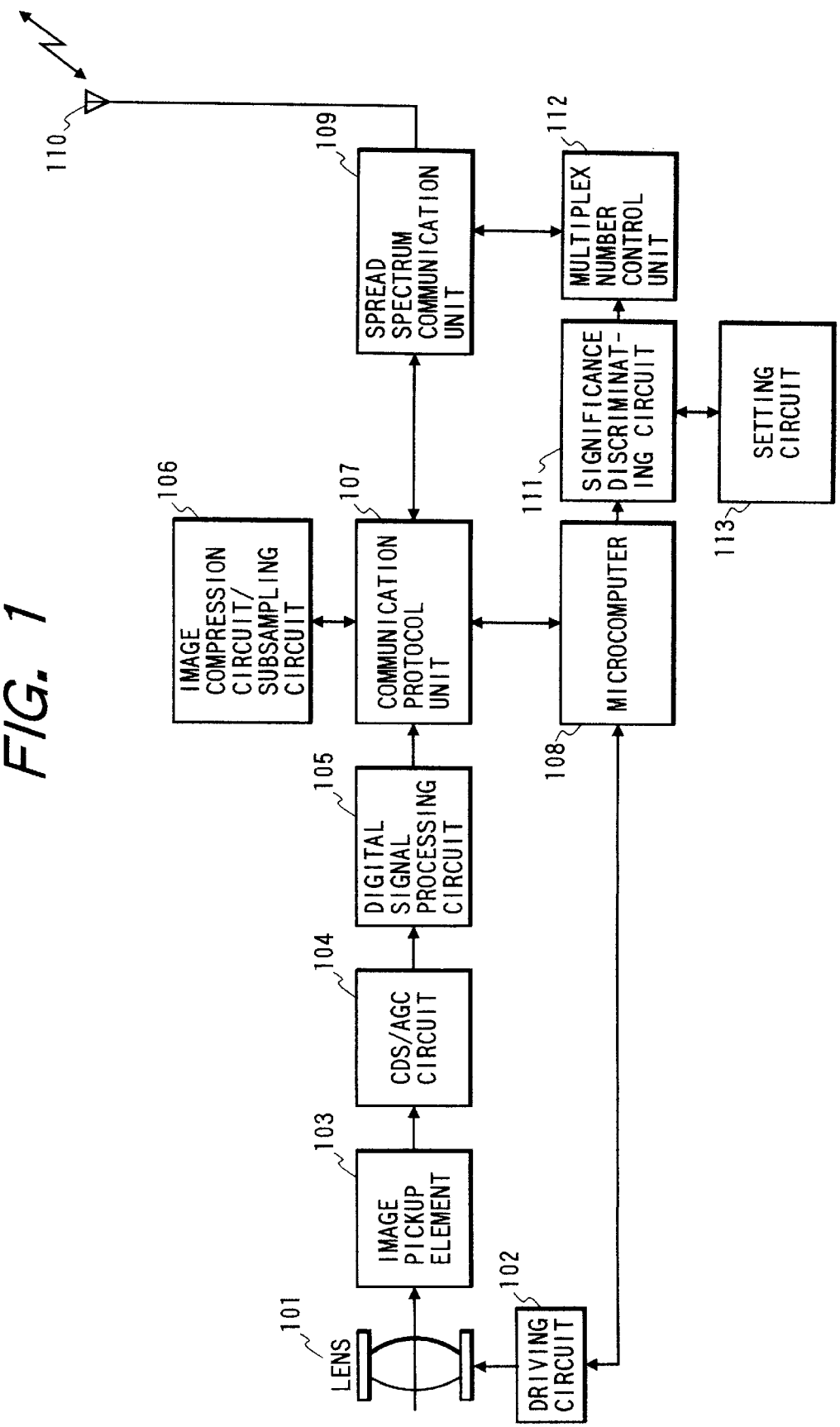
FIG. 1 is a block diagram showing the structure of a radio communication apparatus A according to a first embodiment of the invention.
Figure 2:
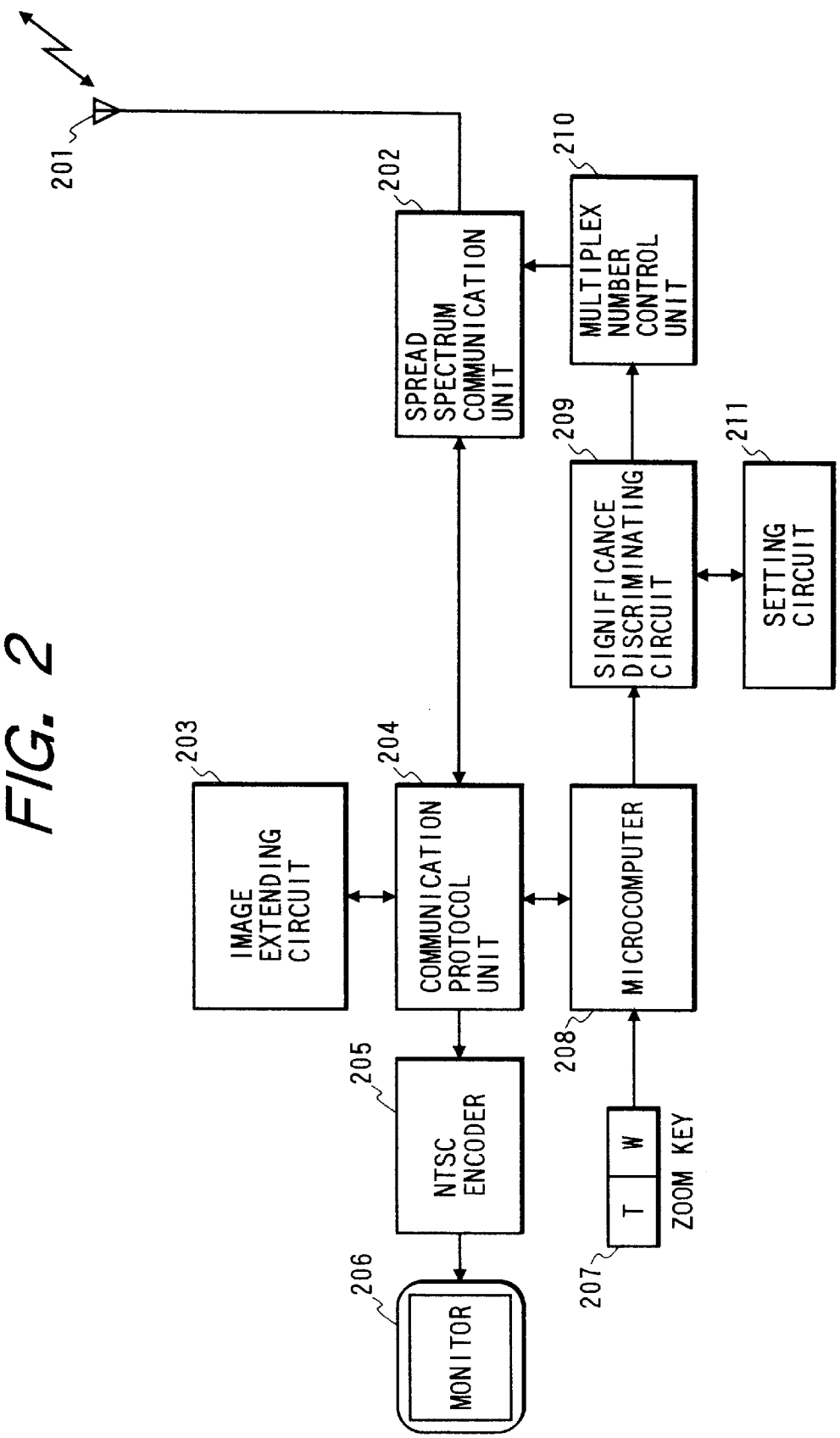
FIG. 2 is a block diagram showing the structure of a radio communication apparatus B according to the first embodiment of the invention.

FIGS. 1 and 2 are block diagrams showing the structures of radio communication apparatuses A and B using spread spectrum communication (code division multiplex scheme) according to the first embodiment of the invention. The radio communication apparatuses A and B shown in FIGS. 1 and 2 perform bidirectional radio transmissions.

In FIG. 1, reference numeral 101 represents a lens for taking an optical image of a subject. Reference numeral 102 represents a driving circuit for changing a magnification factor of the lens 101. Reference numeral 103 represents an image pickup element for generating an image pickup signal from the optical image of a subject. Reference numeral 104 represents a CDS/AGC circuit for sampling and holding the image pickup signal and changing its level to a proper level. Reference numeral 105 represents a digital signal processing circuit for A/D converting the image pickup signal output from CDS/AGC 104 into an image signal of standard television systems such as NTSC system. Reference numeral 106 represents an image compression circuit/sub-sampling circuit. Reference numeral 107 represents a communication protocol unit for controlling to convert the compressed and coded image signal and a control signal into transmission data of a predetermined unit suitable for spread spectrum communications. Reference numeral 108 represents a microcomputer for controlling each processing circuit of the radio communication apparatus A. Reference numeral 109 represents a spread spectrum communication unit for data communications while a code division multiplex number is changed with a significance factor. Reference numeral 110 represents an antenna. Reference numeral 111 represents a significance discriminating circuit for discriminating a significance factor of transmission data or reception data. Reference numeral 112 represents a multiplex number control unit for switching between multiplex numbers of transmission data in accordance with an output from the significance discriminating circuit 111. Reference numeral 113 represents a setting circuit for manually setting a significance factor of transmission data.

In FIG. 2, reference numeral 201 represents an antenna. Reference numeral 202 represents a spread spectrum communication unit for detecting a signal received with the antenna 201. Reference numeral 203 represents an image extending circuit for extending received image signal data. Reference numeral 204 represents a communication protocol unit for controlling to convert received transmission data of a predetermined unit into an image signal before the transmission. Reference numeral 205 represents an NTSC encoder used for supplying the image signal to a monitor 206. Reference numeral 207 represents a zoom key for controlling the zoom operation of the lens 101. Reference numeral 208 represents a microcomputer for controlling each processing circuit of the radio communication apparatus B. Reference numeral 209 represents a significance discriminating circuit for discriminating a significance factor of reception data or transmission data. Reference numeral 210 represents a multiplex number control unit for switching between multiplex numbers of transmission data in accordance with an output from the significance discriminating circuit 209. Reference numeral 211 represents a setting circuit for manually setting the significance factor of transmission data.

Figure 3:
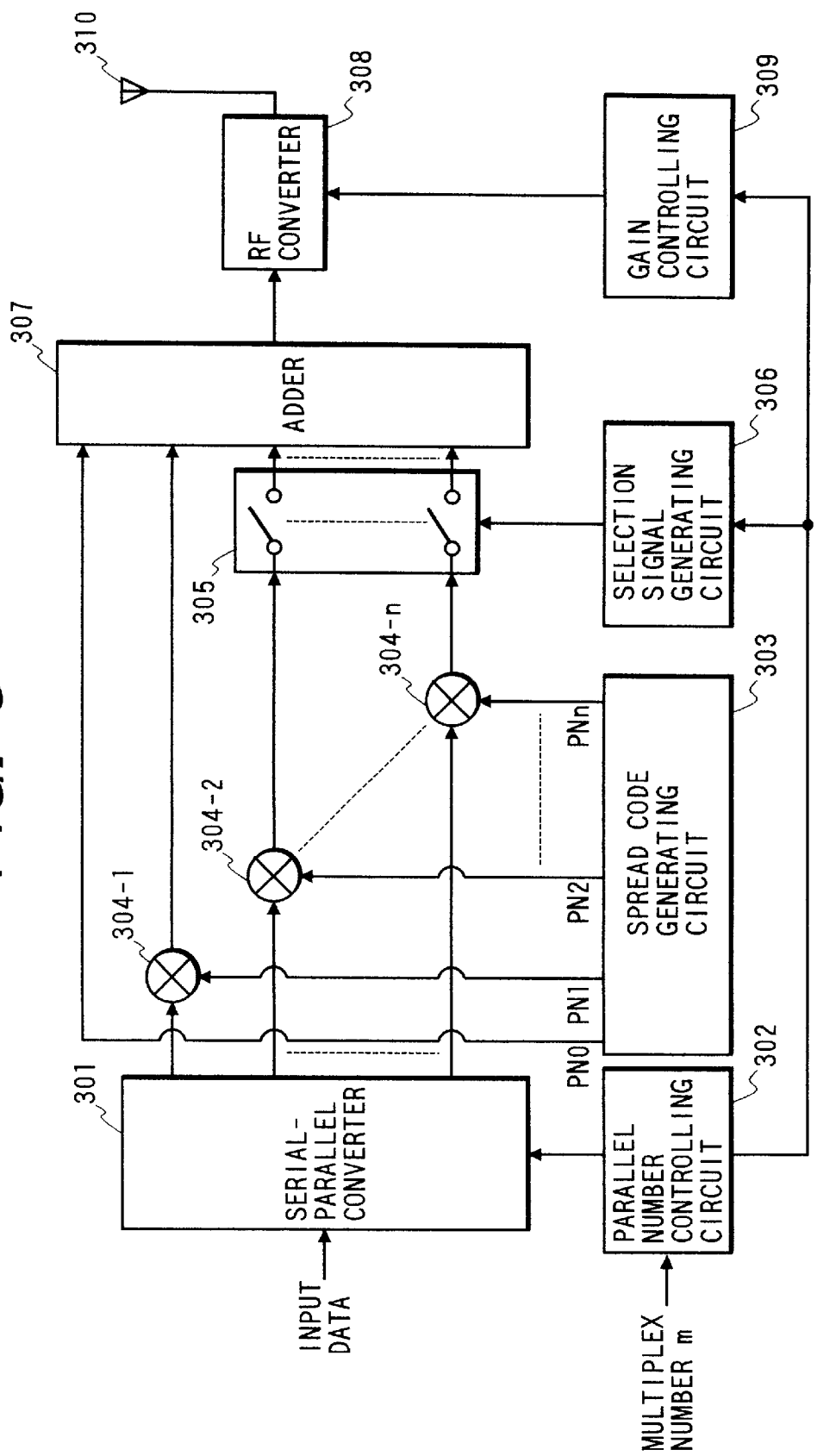
FIG. 3 is a block diagram showing the structure of a transmission circuit provided in a spread spectrum communication unit 109, 202 of the first embodiment.
Figure 4:
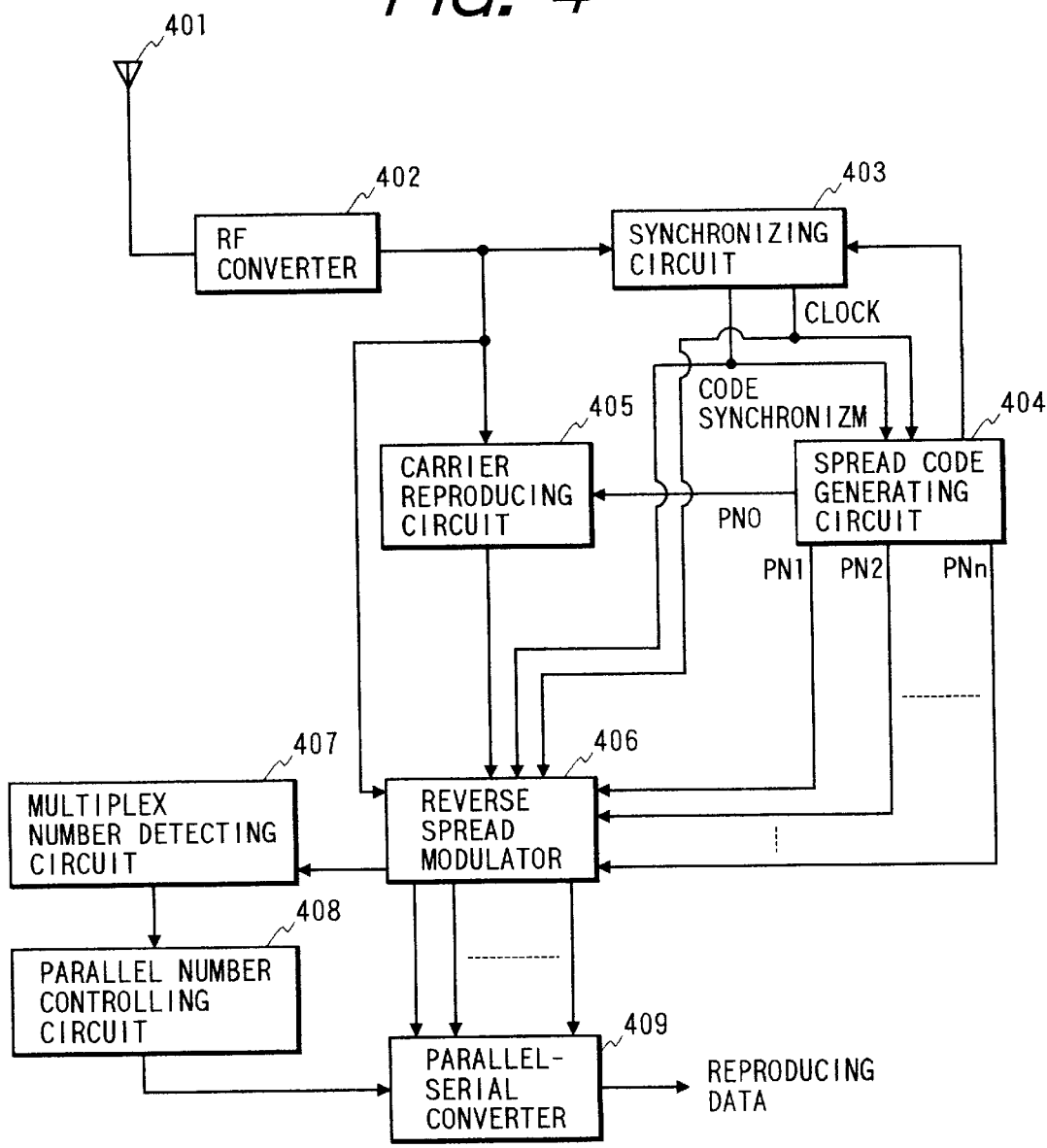
FIG. 4 is a block diagram showing the structure of a reception circuit provided in the spread spectrum communication unit 109, 202 of the first embodiment.

FIG. 3 is a detailed block diagram showing a transmission circuit provided at the spread spectrum communication unit 109, 202, and FIG. 4 is a detailed block diagram showing a reception circuit provided at the spread spectrum communication unit 109, 202.

In FIG. 3, reference numeral 301 represents a serial-parallel converter for dividing data, e.g., compressed and coded image data, serially input in a predetermined block unit, into m (m≦n) parallel data sets, and converting the m parallel data sets into n parallel data sets including m parallel data sets and (n−m) dummy data sets. Reference numeral 302 represents a parallel number controlling circuit for calculating the multiplex number m from an output of the multiplex number control unit 112, 210, and in accordance with the calculated result, controlling the serial-parallel converter 301, a selection signal generating circuit 306, and a gain controlling circuit 309. Reference numeral 303 represents a spread code generating circuit for generating n different spread codes (PN1 to PNn) and a spread code (PN0) used for synchronization only. Reference numerals 304-1 to 304-n represent multipliers for multiplying the n parallel data sets and the n spread codes (PN1 to PNn) together. Reference numeral 305 represents a switch for selecting (n−1) outputs of the multipliers 304-2 to 304-n in accordance with the multiplex number m. The selection signal generating circuit 306 controls the switch 305 in accordance with the multiplex number m. Reference numeral 307 represents an adder for adding the sync-only spread code PN0 and the outputs of the multipliers 304-1 to 304-n together. Reference numeral 308 represents an RF converter for converting an output of the adder 307 into a signal having a radio transmission frequency. The gain controlling circuit 309 controls the output level of the RF converter 308 in accordance with the multiplex number m. Reference numeral 310 represents an antenna.

In FIG. 4, reference numeral 401 represents an antenna. Reference numeral 402 represents an RF converter. Reference numeral 403 represents a synchronizing circuit for establishing spread code synchronization and clock synchronization and maintaining a synchronized state. Reference numeral 404 represents a spread code generating circuit for generating the spread codes same as those on the transmission side, in accordance with a code synchronization signal and a clock signal generated by the synchronizing circuit 403. Reference numeral 405 represents a carrier reproducing circuit for reproducing a carrier signal from a carrier reproducing spread signal output from the spread code generating circuit 404. Reference numeral 406 represents a reverse spread modulator for performing a reverse spread modulation process of the spread modulated m (m≦n) parallel data sets. Reference numeral 407 represents a multiplex number detecting circuit for detecting a multiplex number from an output of the reverse spread modulator 406. Reference numeral 408 represents a parallel number controlling circuit for controlling a parallel-serial converter 409 in accordance with an output from the multiplex number detecting circuit 407. The parallel-serial converter 409 selects necessary m parallel data sets from n parallel data sets output from the reverse spread modulator 406 and converts them into serial data trains.

The operation of the transmission and reception circuits of the spread spectrum communication unit 109, 202 constructed as above will be described.

Referring to FIG. 3, in accordance with a multiplex number m supplied from the multiplex number control unit 112, 210, the parallel number controlling circuit 302 determines a division number of data input from the communication protocol unit 107, 204. The serial-parallel converter 301 divides data serially input in the predetermined block unit into m (m≧n) parallel data sets and converts them into n parallel data sets including m parallel data sets and (n−m) dummy data sets.

The spread code generating circuit 303 generates (n+1) different spread codes PN0 to PNn having the same code period. Of these spread codes, PN0 is used only for synchronization and carrier reproduction, and is directly input to the adder 307. The remaining n spread code series PN1 to PNn are supplied to the n multipliers 304-1 to 304-n for the spread modulation of the m parallel data sets output from the serial-parallel converter 301.

Of the n spread modulated data sets, only the m data sets are necessary and the (n−m) dummy data sets are unnecessary. To this end, the selection signal generating circuit 306 causes the switch 305 to select the m data sets. The selected m signals as well as the sync-only signal PN0 are input to and multiplexed by the adder 307.

The adder 307 linearly adds the (m+1) signals (m spread modulated signals and sync-only signal PN0) together to thereby output a baseband signal to the RF converter 308. The RF converter 308 converts the baseband signal into an RF signal having a suitable center frequency which is then transmitted from the antenna 310.

Referring to FIG. 4, a signal received with the antenna 401 is filtered and amplified by the RF converter 402 to convert it into a suitable intermediate frequency signal which is then input to the synchronizing circuit 403. The synchronizing circuit 403 establishes spread code synchronization and clock synchronization of the received signal, and outputs a code synchronization signal and a clock signal to the spread code generating circuit 404.

After the synchronization is established by the synchronizing circuit 403, the spread code generating circuit 404 generates a plurality of spread codes having the same clock and phases as the transmitted spread codes. Of the plurality of generated spread codes, the sync-only spread code PN0 is input to the carrier reproducing circuit 405 which reproduces a carrier from an output of the RF converter 402 by using the sync-only spread code PN0.

The reproduced carrier as well as an output of the RF converter 402 is input to the reverse spread modulator 406 to generate the baseband signal. This baseband signal is reverse spread modulated into n parallel data sets by using the n spread codes PN1 to PNn generated by the spread code generating circuit 404. The reverse spread modulator 406 also loads a correlation value between each spread code of one period and the received signal, to the multiplex number detecting circuit 407.

If the absolute value of a correlation value of each spread code is smaller than a predetermined value, the multiplex number detecting circuit 407 judges that this spread code was not transmitted. The multiplex number detecting circuit 407 counts the number of spread codes having the absolute number of a correlation value equal to or larger than the predetermined value, and outputs this count as the multiplex number m to the parallel number controlling circuit 408. By using this multiplex number m, the parallel-serial converter 409 converts only the m effective data sets among those n parallel data sets demodulated by the reverse spread modulator 406, into a serial data train which is output as reproduced data.

The operation of the radio communication apparatuses A and B constructed as above will be described next.

An optical image of a subject picked up with the lens 101 of the radio communication apparatus A is converted into a digital image signal of NTSC system or the like, by the image pickup element 103, CDS/AGC 104 and digital signal processing circuit 105. This digital image signal is subjected to a predetermined compression/coding process, or if necessary a sub-sampling process, at the image compression circuit/sub-sampling circuit 106 for the reduction of data amount. The communication protocol unit 107 converts the compressed and coded digital image signal and control signal into a transmission data signal and control signal of a predetermined unit suitable for spread spectrum communications. The transmission data signal is input to the spread spectrum communication unit 109 which performs spread spectrum modulation using code division multiplex and transmits the spread spectrum modulated signal via the antenna 110. Audio signals are collected by an unrepresented microphone and processed by the digital signal processing circuit 105.

Data to be transmitted from the radio communication apparatus A includes image signals, audio signals, control signals, and the like. Depending upon the contents of data, reliable transmission without any error becomes necessary in some cases, whereas high speed data transmission allowing some errors becomes necessary in other cases. In order to realize proper transmission matching such user needs, it is necessary to set a significance factor on the basis of the contents or types of transmission data.

In this embodiment, the significance factor is either a predetermined value preset in accordance with the contents or types of transmission data, or a value manually set by a user with the setting circuit 113. For example, the significance factor of data such as control signals required to be reliably transmitted is set highest, and is set lower for audio signals and image signals in this order in accordance with an allowable transmission error rate. The microcomputer 108 detects the contents or types of transmission data and outputs the detection result to the significance discriminating circuit 111. The significance discriminating circuit 111 discriminates a significance factor of the transmission data in accordance with the predetermined value or manually set value, and supplies the discrimination result to the multiplex number control unit 112. The multiplex number control unit 112 sets a multiplex number corresponding to the significance factor and sends it to the spread spectrum communication unit 109.

Control signals to be transmitted from the radio communication apparatus A include a signal for controlling the communications between the radio communication apparatuses A and B, a signal representative of the state of the image pickup unit (constituted of the lens 101 and driving circuit 102), a signal representative of information inherent to transmission data such as the contents, types and compression factor of transmission data, and other signals. The multiplex number control unit 112 controls to perform spread spectrum communications so that such control signals can be transmitted reliably as data having a high significance factor, at a multiplex number lower than those of image signals and audio signals.

A signal received with the antenna 201 of the radio communication apparatus B is reverse spread modulated by the spread spectrum communication unit 202, and converted into digital image data by the communication protocol unit 204. The digital image data subjected to compression is extended by the image extending circuit 203 and supplied via the NTSC encoder 205 to the monitor 206. In the above manner, the image signal picked up with the lens 101 of the radio communication apparatus A shown in FIG. 1 and the audio signal are transmitted through spread spectrum communication and received by the radio communication apparatus B and output to the monitor 206.

The radio communication apparatus B not only receives information signals such as image signals and audio signals transmitted from the radio communication apparatus A, but also transmits control signals for controlling the operations (zooming, focussing, and etc.) of the image pickup unit (101, 102) of the radio communication apparatus A.

For example, as a user performs a zooming operation with the zoom key 207, a control signal representative of the operation of the zoom key 207 is supplied via the microcomputer 208 and communication protocol unit 204 to the spread spectrum communication unit 202. The spread spectrum communication unit 202 spread modulates this control signal which is then transmitted via the antenna 201 to the radio communication apparatus A. The transmitted control signal is received with the antenna 110 of the radio communication apparatus A, reverse spread modulated by the spread spectrum communication unit 109, and supplied via the communication protocol unit 107 to the microcomputer 108. In accordance with the supplied control signal, the microcomputer 108 controls the driving circuit 102 to zoom the lens 101 in the manner as the user intends to control.

In the above manner, it is possible to drive the image pickup unit including the lens 101 by transmitting a control signal (such as a zooming signal) from the radio communication apparatus B to the radio communication apparatus A. This means that the radio communication apparatus B can remotely control the function of the camera of the radio communication apparatus A.

In this embodiment, similar to the radio communication apparatus A, also the radio communication apparatus B changes the multiplex number in accordance with the significance factor of transmission data. Specifically, the significance discriminating circuit 209 discriminates a significance factor in accordance with the predetermined value or manually set value with the setting circuit 211. In accordance with this discrimination result, the multiplex number control unit 210 can adjust the multiplex number. The multiplex number control unit 210 controls to perform spread spectrum communication so that control signals discriminated by the significance discriminating circuit 209 as data having a highest significance factor can be transmitted at a multiplex number smaller than that of at least image signals and audio signals. The significance factor of audio signals is set higher than that of image signals.

As described so far, according to the first embodiment, it is possible to control the code division multiplex number m in accordance with the contents, types and the like of transmission data. For example, the multiplex number m is set to 2 or larger for the transmission of image signals, and set smaller than at least that of the image signals for the transmission of control signals. In this manner, it is possible to perform good radio transmission highly resistant to multipath fading.

In the first embodiment of this invention, a significance factor is set in accordance with the contents, types and the like of transmission data. For example, the significance factor is set higher for signals such as control signals necessary for reliable transmission without errors, whereas it is set lower for signals such as image signals allowing some errors in order to raise the transmission rate. Since the modulation process is controlled in accordance with the significance factor set in the above manner, good data transmission can be performed without failure.

Further, according to the first embodiment of the invention, the multiplex number is dynamically controlled, by reducing the number for transmission data of a high significance factor and increasing it for transmission data of a low significance factor. Accordingly, both the error rate and transmission rate can be satisfied in a relatively simple manner in accordance with the contents, types and the like of transmission data.

Still further, according to the first embodiment of the invention, since the significance factor can be manually set by a user, good data transmission satisfying the user needs can be achieved.

(Second Embodiment)

Figure 5:
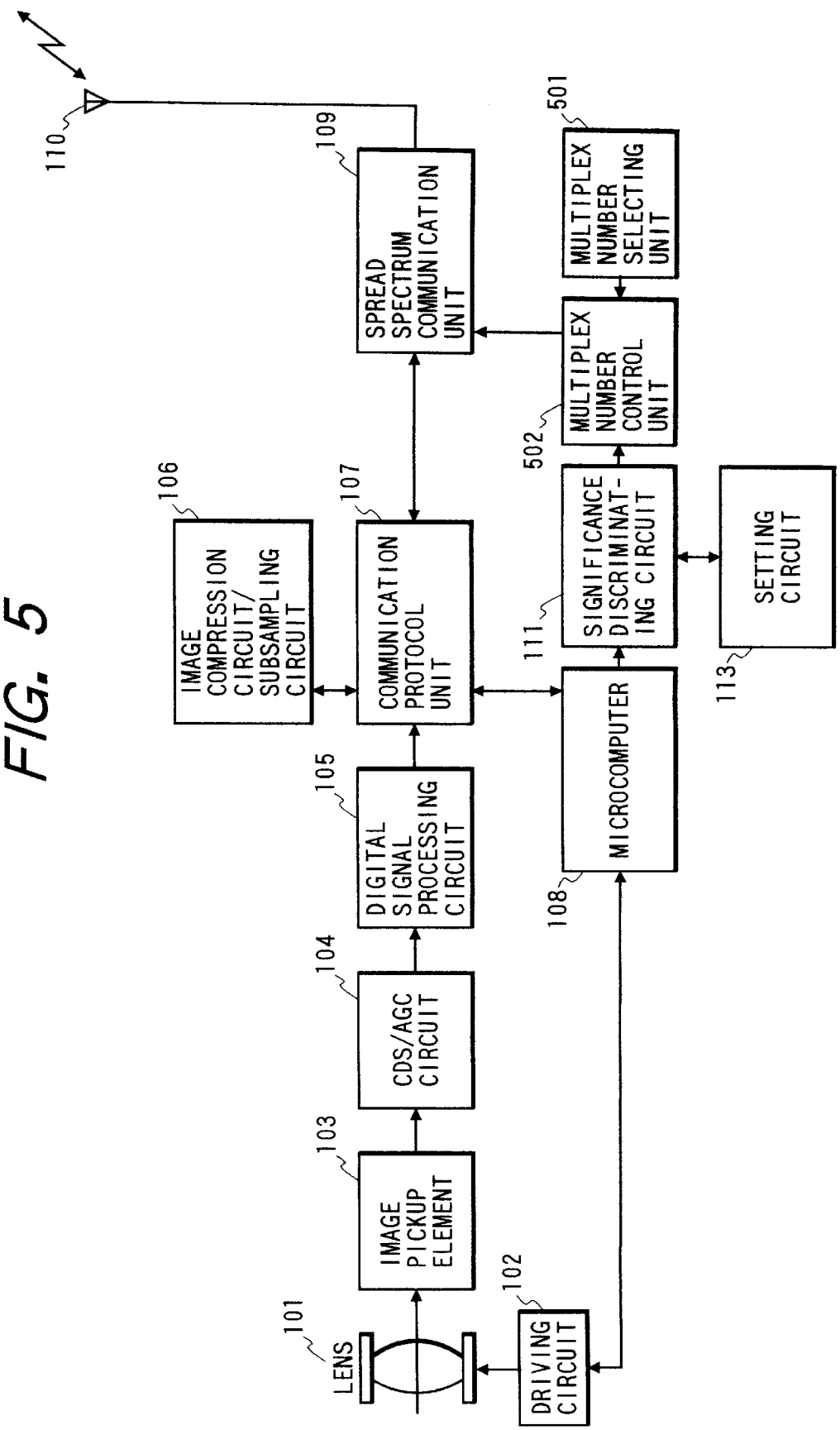
FIG. 5 is a block diagram showing the structure of a radio communication apparatus A according to a second embodiment of the invention.
Figure 6:
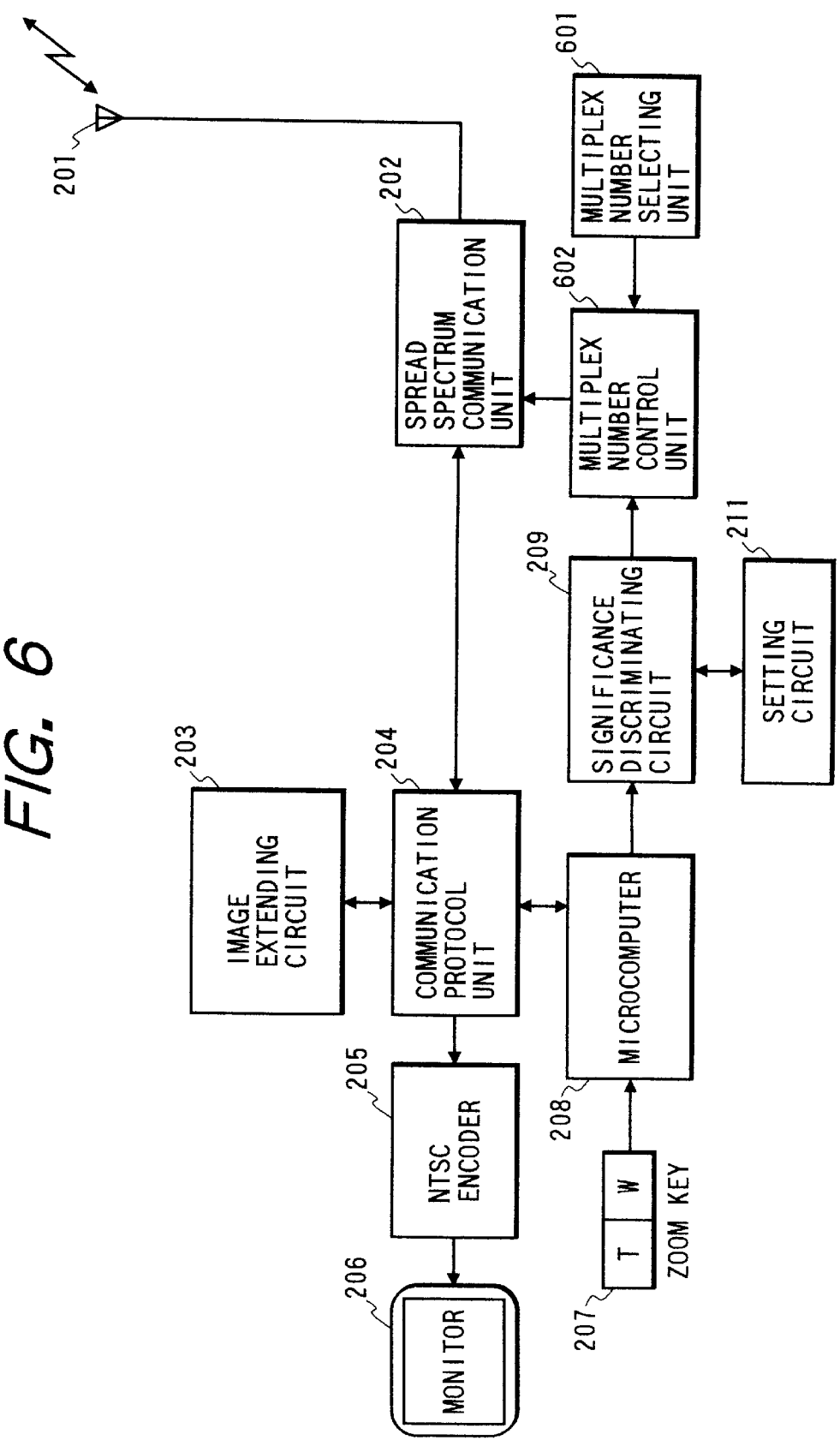
FIG. 6 is a block diagram showing the structure of a radio communication apparatus B according to the second embodiment of the invention.

FIGS. 5 and 6 are block diagrams showing the structures of radio communication apparatuses A and B using spread spectrum communication (code division multiplex scheme) according to the second embodiment of the invention. The radio communication apparatuses A and B shown in FIGS. 5 and 6 perform bidirectional radio transmissions.

Like elements to those of the first embodiment are represented by using identical reference numerals, and the detailed description thereof is omitted.

In FIG. 5, reference numeral 501 represents a multiplex number selecting unit, and reference numeral 502 represents a multiplex number control unit.

In FIG. 6, reference numeral 601 represents a multiplex number selecting unit, and reference numeral 602 represents a multiplex number control unit.

The operation of the radio communication apparatuses A and B constructed as above will be described.

The radio communication apparatus of this embodiment is provided with a function of directly controlling a multiplex number manually by a user, in addition to the function of automatically controlling the multiplex number of transmission signal in accordance with the predetermined or manually set significance factor like the first embodiment.

Similar to the first embodiment, the radio communication apparatus A transmits information signals such as image signals, audio signals and control signals via the spread spectrum communication unit 109 and antenna 110. The significance factors are set higher in the order of image signals, audio signals and control signals.

Similar to the first embodiment, control signals to be transmitted from the radio communication apparatus A include a signal for controlling the communications between the radio communication apparatuses A and B, a signal representative of the state of the image pickup unit (constituted of the lens 101 and driving circuit 102), a signal representative of information inherent to transmission data such as the contents, types and compression factor of transmission data, and other signals. The multiplex number control unit 502 controls to perform spread spectrum communications so that such control signals can be transmitted reliably as data having a high significance factor, at a multiplex number lower than those of at least image signals and audio signals.

A transmitted information signal is received with the antenna 201 of the radio communication apparatus B, and input to the spread spectrum communication unit 202. As described with the first embodiment, the received signal is demodulated and subjected to various processes at the image extending circuit 203, communication protocol unit 204 and NTSC encoder 205 to be output from the monitor 206.

Similar to the first embodiment, the radio communication apparatus B not only receives information signals such as image signals and audio signals transmitted from the radio communication apparatus A, but also transmits control signals for controlling the operations (zooming, focussing, and etc.) of the image pickup unit (101, 102) of the radio communication apparatus A.

Similar to the first embodiment, the multiplex number of an information signal to be transmitted between the radio communication apparatuses A and B is determined in accordance with the significance factor at each apparatus. The significance factor is either a predetermined value preset in accordance with the contents of transmission data, or a value manually set by a user with the setting circuit 113, 211.

The multiplex number selecting unit 501, 601 is an external switch which a user operates upon to control the multiplex number of transmission data. If the multiplex number control unit 502, 602 gives a priority of the multiplex number manually set with the multiplex number selecting unit 501, 601, over the multiplex number automatically discriminated by the significance discriminating circuit 111, 209, then the control intended by the user becomes possible. For example, if a user determines that the contents of transmission data are important and are required to be reliably transmitted, the user can set the multiplex number smaller than the predetermined value as much as possible. On the other hand, if a user determines that the transmission data amount is to be set as large as possible even with some errors, then the user can set the multiplex number larger than the predetermined value as much as possible.

As described so far, according to the second embodiment, it is possible to control the code division multiplex number m in accordance with the contents, types and the like of transmission data. For example, the multiplex number m is set to 2 or larger for the transmission of image signals, and set smaller than at least that of the image signals for the transmission of control signals. In this manner, it is possible to perform good radio transmission highly resistant to multipath fading.

In the second embodiment of this invention, a significance factor is set in accordance with the contents, types and the like of transmission data. For example, the significance factor is set higher for signals such as control signals necessary for reliable transmission without errors, whereas it is set lower for signals such as image signals allowing some errors in order to raise the transmission rate. Since the modulation process is controlled in accordance with the significance factor set in the above manner, good data transmission can be performed without failure.

Further, according to the second embodiment of the invention, the multiplex number is dynamically controlled, by reducing the number for transmission data of a high significance factor and increasing it for transmission data of a low significance factor. Accordingly, both the error rate and transmission rate can be satisfied in a relatively simple manner in accordance with the contents, types and the like of transmission data.

Still further, according to the second embodiment of the invention, since the significance factor can be manually set by a user, good data transmission satisfying the user needs can be achieved.

Furthermore, according to the second embodiment of the invention, the modulation process to be controlled by the significance factor can be set manually so that data transmission satisfying the user needs becomes possible.

(Third Embodiment)

In the first and second embodiments, the multiplex number of an information signal to be transmitted is controlled by the significance factor set in accordance with the contents and types of the information signal. In the third embodiment, there is provided, in addition to the functions of the first and second embodiments, a function of controlling the multiplex number of an information signal by the significance factor set in accordance with the properties or components of the information signal.

FIGS. 7 and 8 are block diagrams showing the structures of radio transmission and reception apparatuses according to the third embodiment of the invention. The radio transmission apparatus of FIG. 7 and the radio reception apparatus of FIG. 8 perform bidirectional radio transmissions.

In FIG. 7, reference numeral 701 represents a lens for converging an optical image of a subject to form it on an image pickup element 702 at the next stage. The image pickup element 702 is made of CCDs or the like and converts an optical image of a subject picked up with the lens 701 into an electrical signal. Reference numeral 703 represents a CDS/AGC circuit for sampling and holding an electrical signal supplied from the image pickup element and changing its level to a proper level. Reference numeral 704 represents an image signal processing circuit for A/D converting an output of the CDS/AGC circuit 703 into a digital image signal of a predetermined format. Reference numeral 705 represents a compression processing circuit for performing a predetermined high efficiency coding process of an output of the image signal processing circuit 704. Reference numeral 705 represents a spread spectrum transmitting unit for converting an output of the compression processing circuit 705 into transmission data suitable for spread spectrum transmission. Reference numeral 707 represents a microcomputer used for generating the number k of data sets to be multiplexed (hereinafter called a multiplex number) in accordance with the types and components of a signal to be compressed by the compression processing circuit 705, the multiplex number being used by the spread spectrum transmitting unit 706. Reference numeral 708 represents an antenna for transmitting an output of the spread spectrum transmitting unit 706.

In the radio reception apparatus shown in FIG. 8, reference numeral 801 represents an antenna. Reference numeral 802 represents a spread spectrum receiving unit for detecting an information signal received with the antenna 801. Reference numeral 803 represents an extending circuit for extending a compressed image signal received by the spread spectrum receiving unit 802. Reference numeral 804 represents an NTSC encoder for converting the extended image signal into an analog image signal of NTSC standards and outputting it to a monitor 805 at the next stage. The monitor 805 can display standard television signals such as NTSC signals.

The operation of the radio transmission and reception apparatuses constructed as above will be described.

Figure 9:
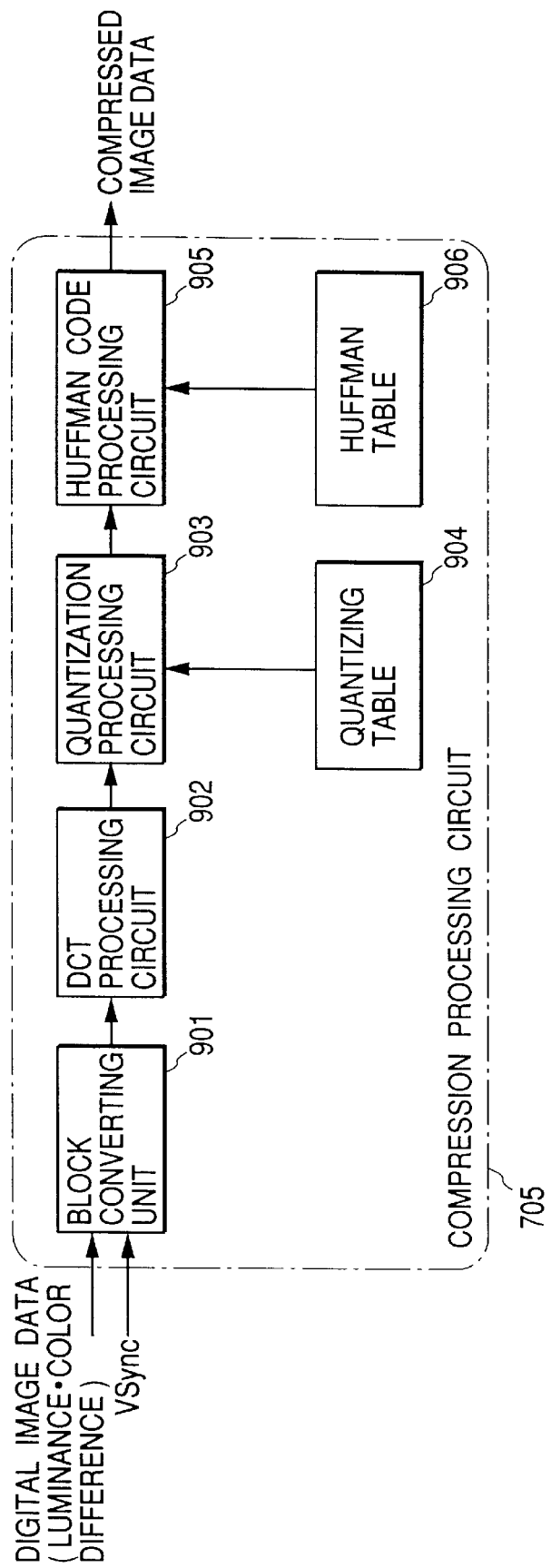
FIG. 9 is a block diagram showing the structure of a compression processing circuit 705 of the third embodiment.

In the radio transmission apparatus, an optical image of a subject taken with the lens 701 and image pickup element 702 is converted into a digital image signal of a standard television signal format (NTSC system or the like) by the CDS/AGC circuit 703 and image signal processing circuit 704, the converted digital image signal being supplied to the compression processing circuit 705. The compression processing circuit 705 performs a predetermined high efficiency compression coding process in order to reduce the data amount. In this embodiment, for the high efficiency compression coding, an orthogonal transform process such as discrete cosine transform (DCT) and wavelet transform is performed and thereafter quantization and variable length coding are performed. FIG. 9 shows an example of the structure of the compression processing circuit 705 for performing a compression process using DCT.

Figure 10:
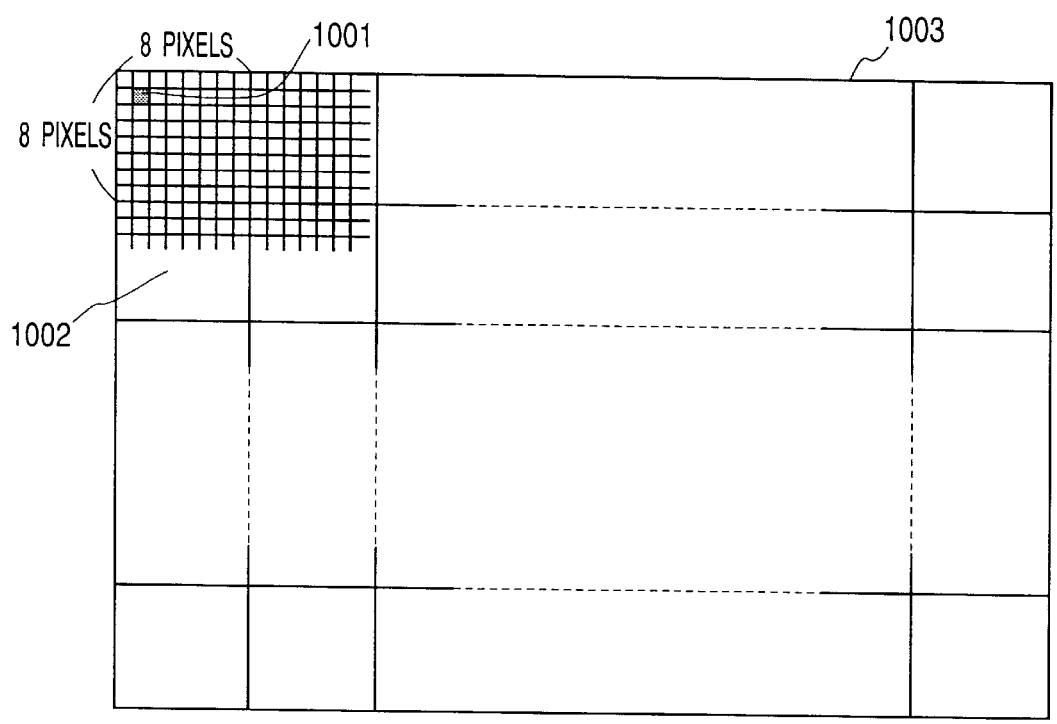
FIG. 10 is a diagram illustrating division of image data of one frame into 8×8 pixel data sets according to the third embodiment of the invention.

In FIG. 9, a block converting unit 901 divides a digital image signal into 8×8 pixel blocks 1002 (FIG. 10) each constituting a data set of 8×8 square matrix. The digital image signal generated by the image signal processing circuit 704 is constituted of a luminance signal and color difference signals. FIG. 10 is a diagram showing image data of one frame divided into 8×8 pixel blocks. The block converting unit 901 divides an image 1003 of one frame into blocks 1002 each having 8 pixels both in the vertical and horizontal directions.

Figures 11, 12:
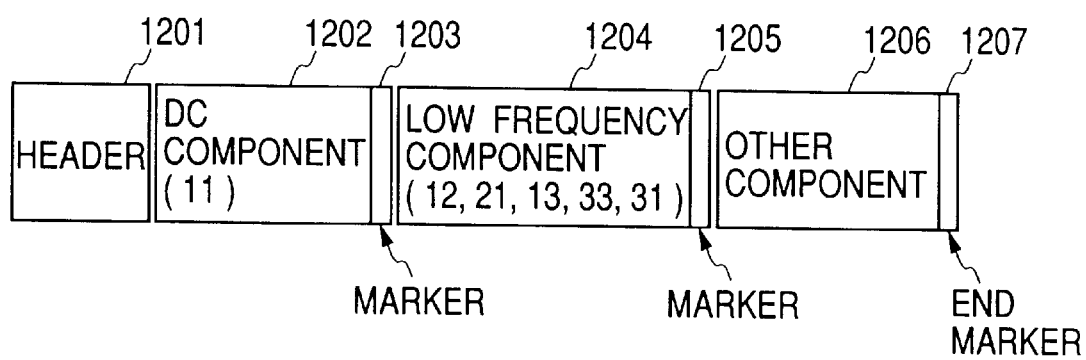
FIG. 11 is a diagram illustrating 8×8 pixel data sets 1002 after DCT conversion according to the third embodiment of the invention.
FIG. 12 shows the data format of compressed image data output from the compression processing circuit 705 of the third embodiment.

A DCT processing circuit 902 performs a transform process called DCT of each block 1002 having an 8×8 pixel unit, to thereby transform data of each block 1002 into frequency domains. FIG. 11 is a diagram showing an 8×8 pixel block 1002 after DCT transform. Each of blocks 1001 divided into 64 blocks are assigned a coefficient.

Referring to FIG. 11, the abscissa represents horizontal components, and the ordinate represents vertical components. The frequency components of each block 1001 become low toward the upper left, and high toward the lower right. The coefficient for a DC component having the lowest frequency is "11", and other coefficients are for AC components. AC components for the coefficients "12", "21", "13", "22", and "31" become high in this order.

Each 8×8 pixel block 1002 of one frame DCT transformed by the DCT processing circuit 902 is supplied to a quantization processing circuit 903. The quantization processing circuit 903 performs quantization by using a coefficient table called a quantizing table 904. The quantizing table 904 assigns a higher weight to high frequency components than to low frequency components. Therefore, after quantization, data for higher frequency components is compressed more than lower frequency components.

The image data of one frame after quantization of each 8×8 block 1002 is separated into DC components (11), low frequency components (12, 21, 13, 22, 31) and other frequency components, which are collected independently for each frequency component. The DC components, low frequency components and other frequency components of one frame are supplied to a Huffman code processing circuit 905 which performs Huffman coding by using a Huffman table 906.

FIG. 12 shows the format of compressed image data of one frame output from the compression processing circuit 705.

In FIG. 12, reference numeral 1201 represents a header affixed to compressed image data of one frame unit which indicates the start of each frame and contains various information such as an image resolution and a frame number. Reference numeral 1202 represents data of DC components ("11") of compressed image of one frame unit. Reference numeral 1203 represents a marker indicating the end of DC component data. Reference numeral 1204 represents data of low frequency components ("12", "21", "13", "22", "31") of compressed image of one frame unit. Reference numeral 1205 represents a marker indicating the end of low frequency component data. Reference numeral 1206 represents data of frequency components other than the DC and low frequency components. Reference numeral 1207 represents an end marker indicating the end of compressed image data of one frame unit.

Figure 13:
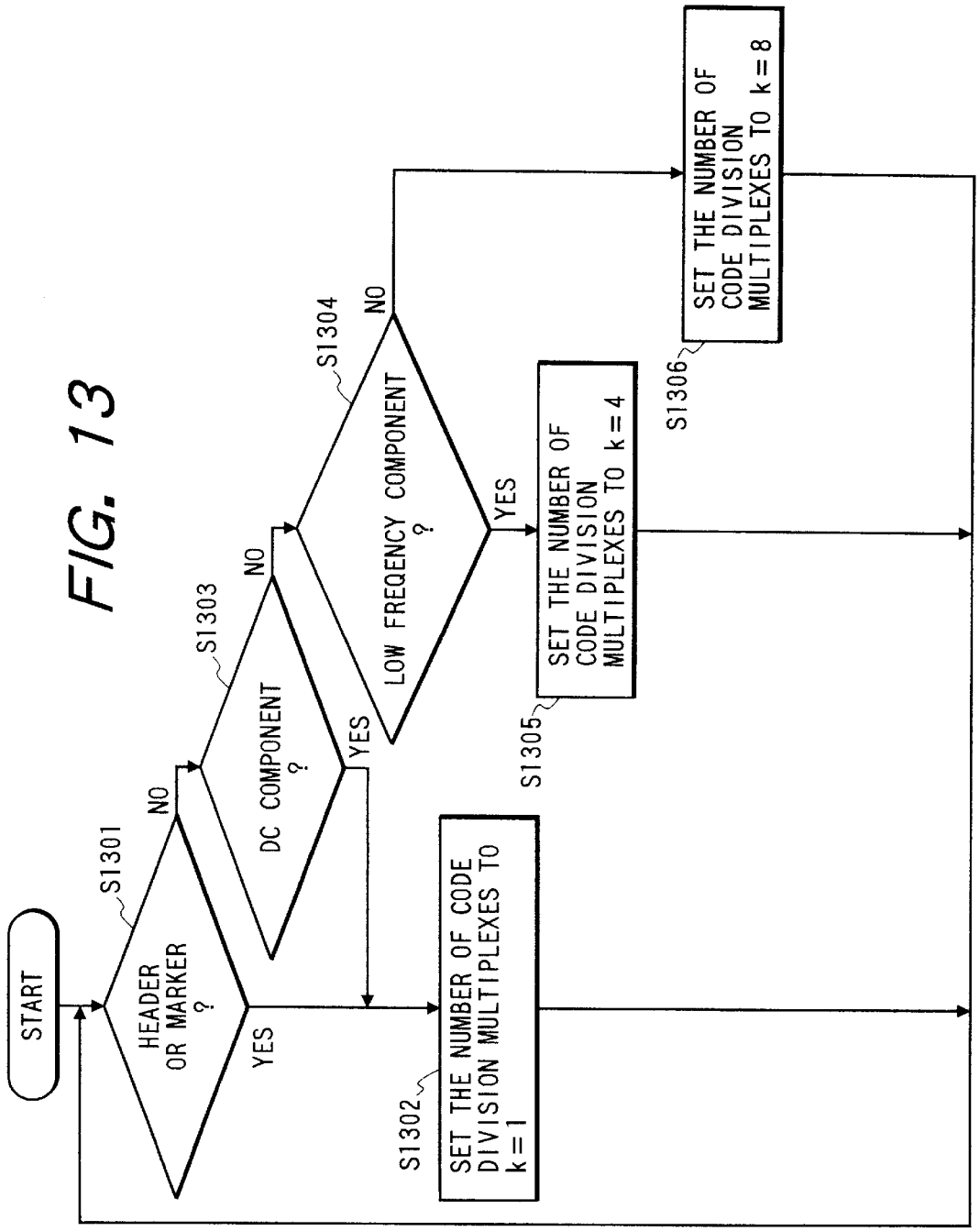
FIG. 13 is a flow chart illustrating the operation of a microcomputer 707 of the third embodiment.

The microcomputer 707 controls the multiplex value k in accordance with the types and frequency components of data output from the compression processing circuit 705, to thereby control the next stage spread spectrum transmitting unit 706. The larger the multiplex number, the more the data can be transmitted via the spread spectrum transmitting unit 706. However, an error occurrence rate during radio transmission becomes high. Therefore, the multiplex number k is set to "1" for important data which is to be transmitted without error. FIG. 13 is a flow chart illustrating the operation of the microcomputer 707 of the third embodiment. The operation will be described specifically with reference to this flow chart.

First, the microcomputer 707 starts discrimination between the types and frequency components of data output in the frame unit from the compression processing circuit 705, and judges whether the type of data is the header 1201, marker 1203, 1205, or end marker 1207 (Step S1301). If the type is the header 1201 or marker 1203, 1205, 1207, the microcomputer 707 judges that the data is important which is to be transmitted without any error, sets the multiplex value k to "1", and supplies it to the next stage spread spectrum transmitting unit 706 (Step S1302). If not, the microcomputer 707 judges whether the data output from the compression processing circuit 705 is data of the DC components 1202 (Step S1303). If the data is of the DC components 1202, the microcomputer 707 sets the multiplex number k to "1" (Step S1302). if the data output from the compression processing circuit 705 is not data of the DC components 1202, the microcomputer 707 judges whether the data is of the low frequency components 1204 (Step S1304). If the data is of the low frequency components 1204, the microcomputer 707 sets the multiplex number k to "4" (Step S1305). If not, the multiplex number k is set to "8" (Step S1306) and supplied to the spread spectrum transmitting unit 706. In the above manner, the multiplex number k is changed with the frequency components of the image signal so that the transmission rate of an image signal can be controlled variably.

The image signal compressed by the compression processing circuit as well as the multiplex number k set by the microcomputer 707 is supplied to the spread spectrum transmitting unit 706. The spread spectrum transmitting unit 706 performs spread spectrum transmission by using the multiplex number k suitable for the frequency components of the image signal. The structure and operation of the spread spectrum transmitting unit 706 of the third embodiment will be described with reference to FIG. 3 described already.

Referring to FIG. 3, in accordance with a multiplex number k supplied from the microcomputer 707, the parallel number controlling circuit 302 determines the multiplex number k of input data. The serial-parallel converter 301 divides data serially input in the predetermined block unit, into k parallel data sets.

The spread code generating circuit 303 generates n different spread codes PN1 to PNn having the same code period and one spread code PN0 dedicated only to synchronization. Of these spread codes, PN0 is directly input to the adder 307 without spread spectrum modulation with parallel data. The remaining n spread code series PN1 to PNn are supplied to the n multipliers 304-1 to 304-n for the spread modulation of the k parallel data sets output from the serial-parallel converter 301.

The selection signal generating circuit 306 controls the switch 305 in accordance with the multiplex number k to select k data sets from the multipliers 304-1 to 304-n. In this manner, the selected k spread spectrum modulated data sets as well as the sync-only spread code PN0 are input to the next stage adder 307. The adder 307 linearly adds the k modulated signals and sync-only spread code PN0 together to thereby output a baseband signal to the RF converter 308. The RF converter 308 converts the baseband signal into an RF signal having a suitable center frequency which is then transmitted from the antenna 310. In this case, the level of a radio signal output from the antenna 310 is required to be constant irrespective of the multiplex number k and therefore a level per one channel is required to be variably controlled. In order to make the level of a radio signal constant, the gain control circuit 309 variably controls the level per one channel in accordance with the multiplex number k.

With the above processes, the radio transmission apparatus of this embodiment can transmit a radio signal to another radio reception apparatus without degrading the quality of an image signal.

In the radio reception apparatus shown in FIG. 8, a radio signal received with the antenna 801 is supplied to the spread spectrum receiving unit 802.

The structure and operation of the spread spectrum receiving unit 802 of the third embodiment will be described with reference to FIG. 4 described already.

Referring to FIG. 4, a signal received with the antenna 401 is filtered and amplified by the RF converter 402 to convert it into a suitable intermediate frequency signal which is then input to the synchronizing circuit 403. The synchronizing circuit 403 establishes spread code synchronization and clock synchronization of the received signal, and outputs a code synchronization signal and a clock signal to the spread code generating circuit 404 and reverse spread modulator 406.

After the synchronization is established by the synchronizing circuit 403, the spread code generating circuit 404 generates a plurality of spread codes having the same clock and phases as the transmitted spread codes. Of the plurality of generated spread codes, the sync-only spread code PN0 is input to the carrier reproducing circuit 405 which reproduces a carrier from an output of the RF converter 402 by using the sync-only spread code PN0.

The reproduced carrier as well as an output of the RF converter 402 is input to the reverse spread modulator 406 to generate the baseband signal. This baseband signal is reverse spread modulated into n parallel data sets by using the n spread codes PN1 to PNn generated by the spread code generating circuit 404. The reverse spread modulator 406 also loads a correlation value between each spread code of one period and the received signal, to the multiplex number detecting circuit 407.

If the absolute value of a correlation value of each spread code is smaller than a predetermined value, the multiplex number detecting circuit 407 judges that this spread code was not transmitted. The multiplex number detecting circuit 407 counts the number of spread codes having the absolute number of a correlation value equal to or larger than the predetermined value, and outputs this count as the multiplex number k to the parallel number controlling circuit 408. By using this multiplex number k, the parallel-serial converter 409 converts only the k effective data sets among those n parallel data sets demodulated by the reverse spread modulator 406, into a serial data train which is output as reproduced data.

A signal output from the spread spectrum receiving unit 802 is subjected to an extending process corresponding to the compression processing circuit 705 on the transmission side, by the image extending circuit 803, and supplied to the NTSC encoder 804. The NTSC encoder 804 converts the extended image signal into a television signal of NTSC standards which is supplied to the monitor 805 to display it thereon.

As described so far, according to the third embodiment, the spread spectrum modulation is controlled in accordance with the frequency components of an image signal. It is therefore possible to perform good radio transmission without degrading the quality of an image signal even under the conditions where multi-path fading occurs.

In the third embodiment, for the spread spectrum modulation transmission of an image signal, the multiplex number is changed in accordance with the frequency components of the image signal. The invention is not limited only to this configuration, but the multiplex number may be changed in accordance with a significance factor of each frequency component of an image signal. For example, the compressed image data may be generated hierarchically in accordance with the resolution of an image of one frame unit, and the multiplex number may be changed in accordance with the resolution.

Also in the third embodiment, although an image signal of one frame unit is processed, an image signal of one field unit may be processed in the similar manner.

(Fourth Embodiment)

The fourth embodiment of the invention will be described with reference to FIGS. 14 to 16. The fourth embodiment has the same structure as the third embodiment so that this embodiment will be described with reference to also FIGS. 7 and 8. The detailed description of the circuit component performing a similar process to the third embodiment is omitted.

In the fourth embodiment, the operation of the compression processing circuit 705 of the third embodiment is different. This different point will be detailed with reference to FIG. 14.

Figure 14:
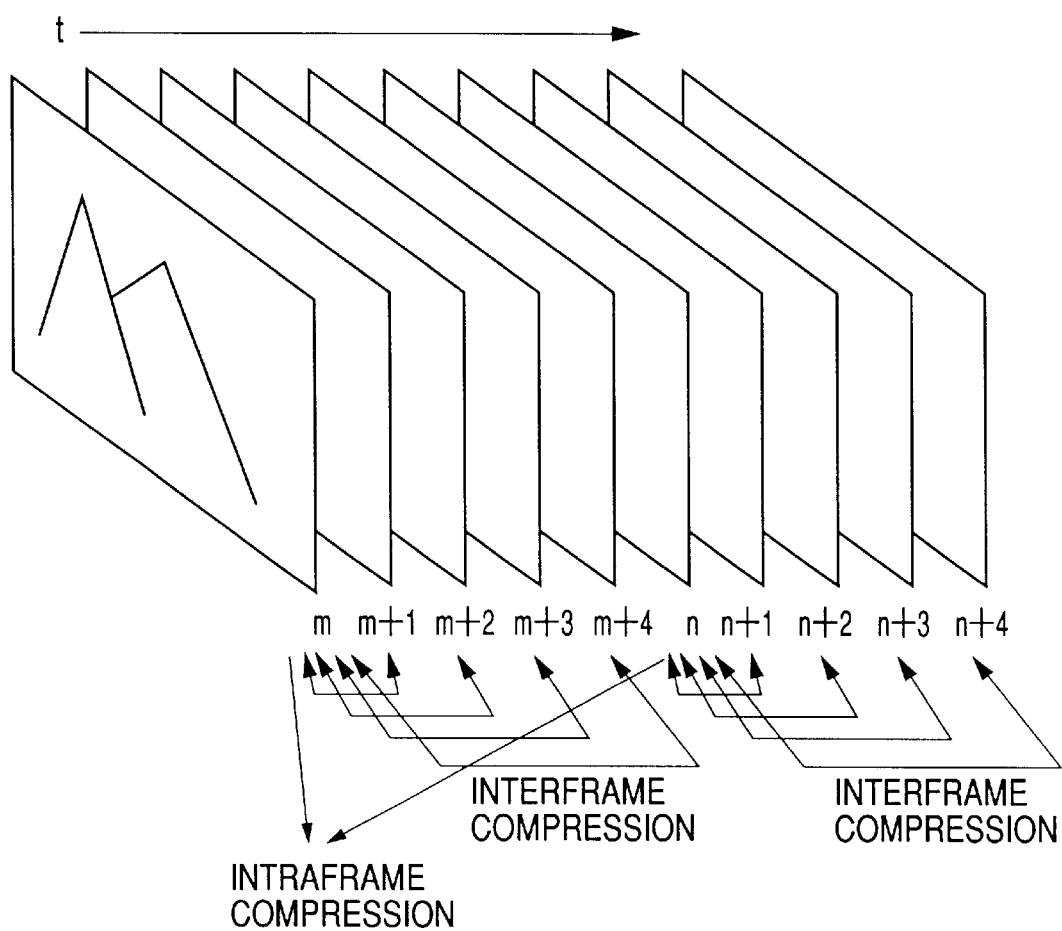
FIG. 14 is a diagram illustrating the operation of a compression processing circuit 705 according to a fourth embodiment of the invention.

FIG. 14 is a diagram illustrating the operation of the compression processing circuit 705 of the fourth embodiment. The compression processing circuit 705 processes sequentially input image signals of one frame unit in a predetermined procedure, by using a compression process completed in one frame (intraframe compression) and a compression process using difference values from respective frames (interframe compression).

Referring to FIG. 14, m to m+4 and n to n+4 represent images of one frame unit sequentially updated with time. Of these frame images, the m and n frames are subjected to intraframe compression similar to the third embodiment. Each of the m+1 to m+4 frames is subjected to interframe compression using orthogonal transform such as DCT, relative to difference values from the m frame. Similarly, each of the n+1 to n+4 frames is subjected to interframe compression by the compression processing circuit 705, relative to difference values from the n frame.

Figure 15:
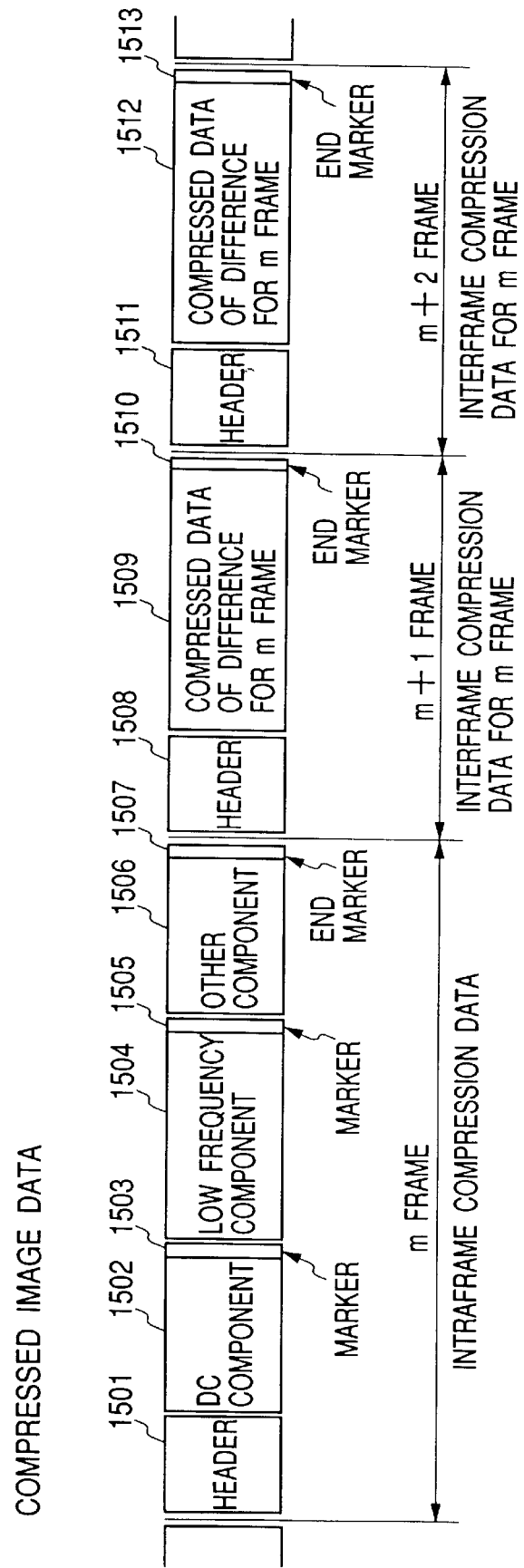
FIG. 15 shows the data format of compressed image data output from the compression processing circuit 705 of the fourth embodiment.

FIG. 15 shows the format of compressed image data output from the compression processing circuit 705 of the fourth embodiment.

Image signals of the frame unit processed by the compression processing circuit 705 is divided into each frame by a header and an end marker. In FIG. 15, reference numerals 1501, 1508 and 1511 represent headers of the m frame, m+1 frame and m+2 frame, and reference numerals 1507, 1510 and 1513 represent end markers of the m frame, m+1 frame and m+2 frame. Similar to the third embodiment, the m frame image signal is compressed and collected as each compressed data of the DC components data 1502, low frequency component data 1504 and other frequency component data 1506. The compressed data of respective frequency components is affixed with markers 1503 and 1505 to indicate the ends of the data of respective frequency components. The m+1 frame image signal is compressed relative to the difference value from the m frame similar to the third embodiment, reference numeral 1509 representing the compressed data of the m+1 frame. Similarly, the m+2 frame image signal is compressed relative to the difference value from the m frame to generate the compressed data 1512. The above structure is also applicable to other frames.

Similar to the third embodiment, the microcomputer 707 of the fourth embodiment controls the multiplex value k in accordance with the types and frequency components of data output from the compression processing circuit 705, to thereby control the next stage spread spectrum transmitting unit 706. The larger the multiplex number k, the more the data can be transmitted via the spread spectrum transmitting unit 706. However, an error occurrence rate during radio transmission becomes high. Therefore, the multiplex number k is set to "1" for important data which is to be transmitted without error. FIG. 16 is a flow chart illustrating the operation of the microcomputer 707 of the fourth embodiment. The operation will be described specifically with reference to this flow chart.

First, the microcomputer 707 starts discrimination between the types and frequency components of data output in the frame unit from the compression processing circuit 705, and judges whether the type of data is the header 1501, 1507, 1511, marker 1503, 1505, or end marker 1507, 1510, 1513 (Step S1601). If the type is the header or marker, the microcomputer 707 judges that the data is important which is to be transmitted without any error, sets the multiplex value k to "1", and supplies it to the next stage spread spectrum transmitting unit 706 (Step S1602). If not, the microcomputer 707 judges whether the data output from the compression processing circuit 705 is data of the DC components 1502 (Step S1603). If the data is of the DC components 1502, the microcomputer 707 sets the multiplex number k to "1" (Step S1602). If the data output from the compression processing circuit 705 is not data of the DC components 1502, the microcomputer 707 judges whether the data is of the low frequency components 1504 (Step S1604). If the data is of the low frequency components 1504, the microcomputer 707 sets the multiplex number k to "2" (Step S1605).

If the data is not of the low frequency components 1504, the microcomputer 707 judges whether the output data is of the other frequency components 1506 (Step S1606). If the data is of the other frequency components 1506, the multiplex number k is set to "4" (Step S1607), whereas if not, it judges that the data was compressed through interframe compression, and sets the multiplex number k to "8" (Step S1608). Namely, the compressed data through intraframe compression (1502, 1504, 1506) and the compressed data through interframe compression (1509, 1512) each have different multiplex numbers k. The various data and frequency component data set with the different multiplex numbers k are supplied to the spread spectrum transmitting unit 706.

As described so far, according to the fourth embodiment, the spread spectrum modulation is controlled in accordance with the frequency components of an image signal, in the similar manner to the third embodiment. It is therefore possible to perform good radio transmission without degrading the quality of an image signal even under the conditions where multi-path fading occurs. Further, since the spread spectrum modulation is controlled in accordance with a plurality of compression coding methods, it is possible to perform radio transmission at an optimum transmission rate without degrading the quality of an image signal even under the conditions where multi-path fading occurs.

In the fourth embodiment, for the spread spectrum modulation transmission of an image signal, the multiplex number is changed in accordance with the frequency components of the image signal. The invention is not limited only to this configuration, but the multiplex number may be changed in accordance with a significance factor of each frequency component of an image signal. For example, the compressed image data may be generated hierarchically in accordance with the resolution of an image of one frame unit, and the multiplex number may be changed in accordance with the resolution.

Also in the fourth embodiment, although an image signal of one frame unit is processed, an image signal of one field unit may be processed in the similar manner.

The invention may be embodied in other specific forms without departing from the spirit or essential characteristics thereof.

For example, a spread spectrum communication system using code division multiplex of an image signal has been described which system has one radio transmission apparatus having an image pickup unit for generating image information and one radio reception apparatus having a monitor unit for displaying the image information. Radio transmission having the similar functions of the invention may be realized also by using a plurality of radio reception and transmission apparatuses.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An apparatus for transmitting an image signal and a control signal about the image signal, said apparatus comprising:
    a modulator which modulates the image signal and the control signal with one or more spreading codes, with a number of spreading codes to modulate the image signal being larger than a number of spreading codes to modulate the control signal; and
    a transmitter which transmits the modulated image signal and the modulated control signal.

2. An apparatus according to claim 1, wherein said modulator modulates the image signal generated by an image pickup unit.

3. An apparatus according to claim 1, wherein said modulator divides the image signal into a plurality of image signal portions, modulates the plurality of image signal portions with a plurality of spreading codes, and multiplexes a plurality of modulated image signal portions.

4. An apparatus according to claim 1, wherein said modulator modulates an audio signal with spreading codes, with a number of spreading codes to modulate the audio signal being larger than a number of spreading codes to modulate the control signal.

5. An apparatus according to claim 4, wherein the number of spreading codes to modulate the image signal is larger than the number of spreading codes to modulate the audio signal.

6. An apparatus according to claim 1, wherein said transmitter transmits the image signal and the control signal by radio waves.

7. An apparatus for transmitting an image signal, said apparatus comprising:
    a converter which converts the image signal into a first image data and a second image data, the first image data including a lower frequency component than the second image data;
    a modulator which modulates the first image data and the second image data with one or more spreading codes, with a number of spreading codes to modulate the first image data being smaller than a number of spreading codes to modulate the second image data; and
    a transmitter which transmits the modulated first image data and the modulated second image data.

8. An apparatus according to claim 7, wherein said converter converts an image signal generated by an image pickup unit.

9. An apparatus according to claim 7, wherein said modulator divides the second image data into a plurality of second image data portions, modulates the plurality of second image data portions with a plurality of spreading codes, and multiplexes a plurality of modulated second image data portions.

10. An apparatus according to claim 7, wherein said modulator modulates an additional data of the image signal with spreading codes, with a number of spreading codes to modulate the additional data being smaller than the number of spreading codes to modulate the second image data.

11. An apparatus according to claim 7, wherein said transmitter transmits the first image data and the second image data by radio waves.

12. An apparatus for transmitting an image signal, said apparatus comprising:
    an encoder which encodes the image signal to generate a first image data or a second image data using a first coding method or a second coding method different from the first coding method;
    a modulator which modulates the first image data and the second image data with one or more spreading codes, with a number of spreading codes to modulate the first image data being smaller than a number of spreading codes to modulate the second image data; and
    a transmitter which transmits the modulated first image data and the modulated second image data.

13. An apparatus according to claim 12, wherein the first coding method is an intraframe coding method and the second coding method is an interframe coding method.

14. An apparatus according to claim 12, wherein said encoder encodes an image signal generated by an image pickup unit.

15. An apparatus according to claim 12, wherein said modulator divides the second image data into a plurality of second image data portions, modulates the plurality of second image data portions with a plurality of spreading codes, and multiplexes a plurality of modulated second image data portions.

16. An apparatus according to claim 12, wherein said modulator modulates an additional data of the image signal with spreading codes, with a number of spreading codes to modulate the additional data being smaller than the number of spreading codes to modulate the second image data.

17. An apparatus according to claim 12, wherein said transmitter transmits the first image data and the second image data by radio waves.

18. A method for transmitting an image signal and a control signal about the image signal, the method comprising the steps of:
  modulating the image signal and the control signal with one or more spreading codes, with a number of spreading codes to modulate the image signal being larger than a number of spreading codes to modulate the control signal; and
  transmitting the modulated image signal and the modulated control signal.

19. A method according to claim 18, wherein said modulating step divides the image signal into a plurality of image signal portions, modulates the plurality of image signal portions with a plurality of spreading codes, and multiplexes a plurality of modulated image signal portions.

20. A method according to claim 18, wherein said modulating step modulates an audio signal with spreading codes, with a number of spreading codes to modulate the audio signal being larger than the number of spreading codes to modulate the control signal.

21. A method according to claim 20, wherein the number of spreading codes to modulate the image signal is larger than the number of spreading codes to modulate the audio signal.

22. A method according to claim 18, wherein said transmitting steps transmits the image signal and the control signal by radio waves.

23. A method according to claim 18, wherein said modulating step modulates an image signal generated by an image pickup unit.

24. A method for transmitting an image signal, the method comprising the steps of:
  converting the image signal into a first image data and a second image data, the first image data including a lower frequency component than the second image data;
  modulating the first image data and the second image data with one or more spreading codes, with a number of spreading codes to modulate the first image data being smaller than a number of spreading codes to modulate the second image data; and
  transmitting the modulated first image and the modulated second image data.

25. A method according to claim 24, wherein said modulating step divides the second image data into a plurality of second image data portions, modulates the plurality of second image data portions with a plurality of spreading codes, and multiplexes a plurality of modulated second image data portions.

26. A method according to claim 24, wherein said modulating step modulates an additional data of the image signal with spreading codes, with a number of spreading codes to modulate the additional data being smaller than the number of spreading codes to modulate the second image data.

27. A method according to claim 24, wherein said transmitting step transmits the first image data and the second image data by radio waves.

28. A method according to claim 24, wherein said modulating step modulates an image signal generated by an image pickup unit.

29. A method for transmitting an image signal, the method comprising the steps of:
  encoding the image signal to generate a first image data or a second image data using a first coding method or a second coding method different from the first coding method;
  modulating the first image data and the second image data with one or more spreading codes, with a number of spreading codes to modulate the first image data being smaller than a number of spreading codes to modulate the second image data; and
  transmitting the modulated first image data and the modulated second image data.

30. A method according to claim 29, wherein said modulating step divides the second image data into a plurality of second image data portions, modulates the plurality of second image data portions with a plurality of spreading codes, and multiplexes a plurality of modulated second image data portions.

31. A method according to claim 29, wherein said modulating step modulates an additional data of the image signal with spreading codes, with a number of spreading codes to modulate the additional data being smaller than the number of spreading codes to modulate the second image data.

32. A method according to claim 29, wherein the first coding method is an intraframe coding method and the second coding method is an interframe coding method.

33. A method according to claim 29, wherein said transmitting step transmits the first image data and the second image data by radio waves.

34. A method according to claim 29, wherein said modulating step modulates an image signal generated by an image pickup unit.

* * * * *

UNITED STATES PATENT AND TRADEMARK OFFICE
CERTIFICATE OF CORRECTION

PATENT NO. : 6,456,607 B2
DATED : September 24, 2002
INVENTOR(S) : Hideyuki Arai et al.

It is certified that error appears in the above-identified patent and that said Letters Patent is hereby corrected as shown below:

<u>Title page,</u>
Item [56], References Cited, FOREIGN PATENT DOCUMENTS,
"JP 07143027" should read -- JP 7-143027 --. "JP 08163085" should read
-- JP 8-163085 --.
Item [57], ABSTRACT,
Line 7, "basing" should read -- based --.

<u>Drawings,</u>
Sheet 4, Fig. 4, "SYNCHRONIZM" should read -- SYNCHRONISM --.
Sheet 11, Fig. 13, "FREQENCY" should read -- FREQUENCY --.
Sheet 14, Fig. 16, "FREQENCY" should read -- FREQUENCY --; and
"COMPRRESSION?" should read -- COMPRESSION? --.

<u>Column 1,</u>
Line 32, "vary" should read -- very --.

<u>Column 8,</u>
Line 18, "m(m$\geq$n)" should read -- m(m$\leq$n) --.

<u>Column 12,</u>
Line 24, "upon" should be deleted.

<u>Column 15,</u>
Line 31, "if the" should read -- If the --.

<u>Column 17,</u>
Line 63, "is" should read -- are --.

UNITED STATES PATENT AND TRADEMARK OFFICE
CERTIFICATE OF CORRECTION

PATENT NO. : 6,456,607 B2
DATED : September 24, 2002
INVENTOR(S) : Hideyuki Arai et al.

It is certified that error appears in the above-identified patent and that said Letters Patent is hereby corrected as shown below:

Column 21,
Line 29, "steps" should read -- step --.
Line 46, "image" should read -- image data --.

Signed and Sealed this

Eighteenth Day of February, 2003

JAMES E. ROGAN
*Director of the United States Patent and Trademark Office*